United States Patent

Kimura et al.

[11] Patent Number: 5,596,258
[45] Date of Patent: Jan. 21, 1997

[54] APPARATUS AND METHOD FOR CHARGING AN ELECTRIC VEHICLE BATTERY

[75] Inventors: Takashi Kimura, Zushi; Shinichi Takenouchi, Ebina, both of Japan

[73] Assignee: Nissan Motor Co., Ltd., Yokohama, Japan

[21] Appl. No.: 247,429

[22] Filed: May 23, 1994

[30] Foreign Application Priority Data

Jun. 1, 1993 [JP] Japan .................................. 5-130882

[51] Int. Cl.[6] .......................... H01M 10/44; H01M 10/46
[52] U.S. Cl. ................................ 320/2; 320/30; 320/48
[58] Field of Search .............................. 320/2, 5, 27, 28, 320/29, 39, 40, 43, 48, 47, 30

[56] References Cited

U.S. PATENT DOCUMENTS

| 5,202,617 | 4/1993 | Nor ............................................. 320/2 |
| 5,341,083 | 8/1994 | Klontz et al. ................................ 320/2 |
| 5,349,535 | 9/1994 | Gupta ....................................... 320/2 X |
| 5,462,439 | 10/1995 | Keith ....................................... 320/2 X |

*Primary Examiner*—Edward H. Tso
*Attorney, Agent, or Firm*—Lowe, Price, LeBlanc & Becker

[57] ABSTRACT

In a charging apparatus and method for charging a battery of a battery driven electric vehicle, when a communication abnormality between a charger side of a charging station and the battery side of the electric vehicle is determined to occur, a power supply of the charger starts the charge to the battery in a special charge pattern (protocol) of mode in the occurrence of the communication abnormality.

21 Claims, 11 Drawing Sheets

APPARATUS AND METHOD FOR CHARGING AN ELECTRIC VEHICLE BATTERY

BACKGROUND OF THE INVENTION (1) Field of the Invention

The present invention relates to a charging apparatus and method for charging a battery of an electric car (vehicle).

(2) Description of the Background Art

A charging station is installed in which a charger used to charge the vehicle battery along with a recent development of electric vehicles.

A charge cable is attached onto the charger at the charging station, a connector located at a tip of the charge cable is connected to a counterpart of a connector located on the electric vehicle so as to carry out the charging operation to the battery of the electric vehicle.

Various types of batteries to be installed in the electric vehicles are recently available. Voltages and currents are different when the charging operation is carried out according to the types of the batteries. Thus, it is necessary at any time to set each one of the voltages and currents according to the kinds of the batteries.

A communication control line is installed in parallel to the charge cable as well as a power line used for charging so that charging conditions including the voltage to be charged and set value of the current are transmitted from the electric vehicle to the charger via the communication line. Therefore, it may be considered that the charger charges the battery installed in the electric vehicle according to the charging conditions.

However, if the charging conditions are transmitted via the communication control line and if a communication abnormality occurs between the charger and electric vehicle, the charging conditions cannot be transmitted and, hence, the charging of the battery cannot be carried out any more.

SUMMARY OF THE INVENTION

It is, therefore, an object of the present invention to provide a charging apparatus and method for an electric vehicle in which even if the communication system between a charger and electric vehicle has failed, the charging operation can be carried out using a charge fail-safe pattern during the communication abnormality.

The above described object can be achieved by a charging apparatus for charging a battery installed in a battery driven electric vehicle, comprising: a) a charger having a power supply; b) communication means, installed in both of the charger and electric vehicle, for transmitting and receiving information on a charging operation from and to the charger and electric vehicle; c) abnormality detecting means For detecting whether an abnormality in the communication between the charger and electric vehicle occurs; and d) controlling means for carrying out the charge to the battery of the electric vehicle in accordance with a special charge protocol previously set when the abnormality detecting means detects the abnormality in the communication therebetween.

The above described object can also be achieved by providing a method for charging a battery installed in a battery driven electric vehicle, comprising the steps of: a) transmitting and receiving information on a charging operation from and to a charger having a high voltage power supply and electric vehicle; b) detecting whether an abnormality in the communication between the charger and electric vehicle occurs; and d) carrying out the charge to the battery of the electric vehicle in accordance with a special charge protocol previously set when detecting that the abnormality in the communication therebetween occurs.

The communication abnormality is defined as no receipt of any desired signal from either a charger controller or battery controller at any desired timing of the protocol. During the occurrence of the communication abnormality, a minimum charge to the battery of the electric vehicle is carried out in accordance with the special charge pattern (protocol) during the occurrence of the communication abnormality.

BRIEF DESCRIPTION OF THE DRAWINGS

FIG. 10 B is another succeeding operational flowchart from FIG. 10 A.

FIG. 10 C is an operational flow chart representing a charger communication abnormality processing routine.

DETAILED DESCRIPTION OF THE PREFERRED EMBODIMENTS

Reference will, hereinafter, be made to the drawings in order to facilitate a better understanding of the present invention.

Figure 1:
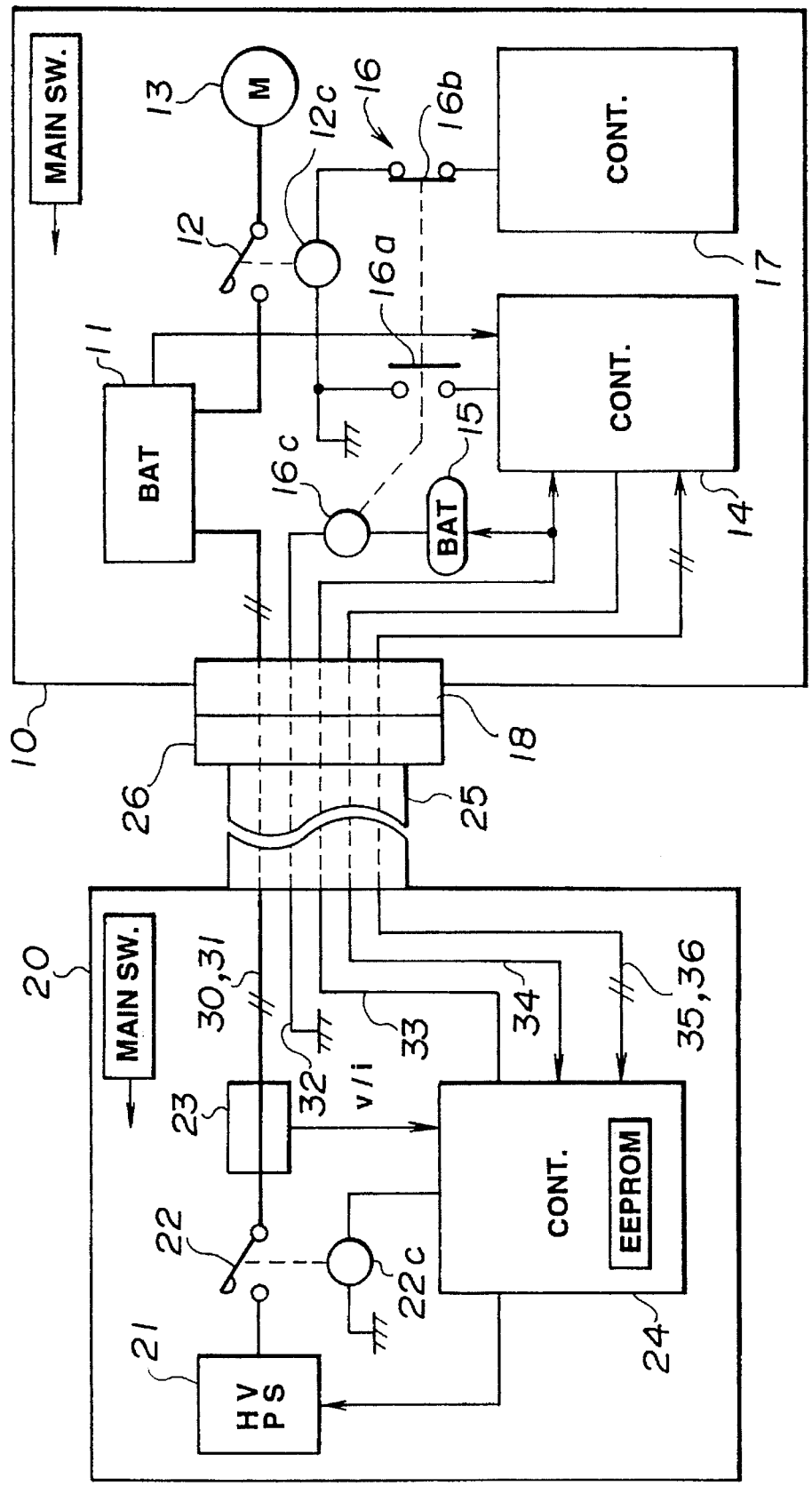
FIG. 1 is a schematic circuit block diagram of a charging apparatus for an electric vehicle in a preferred embodiment according to the present invention.

FIG. 1 shows a block diagram of a preferred embodiment of a charging apparatus for an electric vehicle according to the present invention.

In FIG. 1, an electric vehicle 10 is connected with a charger 20 installed at a charge station via a cable 25 in order to charge a vehicular battery 11 of the electric vehicle 10.

The battery 11 is installed in the electric vehicle 10. During an electric vehicle running, a charged power of the battery 11 is supplied to a running motor 13 via a switch 12. A battery controller 14 includes a microcomputer, its peripheral parts, and drive circuits and is used to control the charge in the battery 11.

In addition, the electric vehicle 10 includes an auxiliary battery 15 which is separate from the battery 11 and which is used to supply a control power supply to various accessories and a charging interlock relay 16. The controller 17 includes a running controller which controls the run of the electric vehicle 10.

On the other hand, the charger 20 installed at the charge station includes: a high voltage power supply 21 which rectifies an AC power supplied from an external transformer; a switch 22 to open and close the charge current; a sensor 23 which detects the charge voltage v and charge current i; and a charger controller 24 which is so constructed as to control the charge operation. A cable 25 is attached onto the charger 20 and a connector 26 located on a tip of the cable 25 which is connected to a counterpart connector 18 located at the electric vehicle 10.

The cable 25 includes two power supply lines 30 and 31 and six control lines 32 through 36. It is noted the control lines 32 through 36 include a grounded line which is omitted in FIG. 1.

The power supply lines 30 and 31 include power lines to supply a charge power to the battery of the electric vehicle from the charger 20 to the electric vehicle 10.

A large cross sectional area is provided with the power supply lines 30 and 31 in order to cause to flow a large amount of charge current.

The control line 32 is a control line used to detect connection states of the connectors 18 and 26, the charger 20 being grounded and the electric vehicle 10 being connected to a coil 16c of the interlock relay 16.

In addition, the control lines 33 through 36 are control lines to transmit various control signals between the battery controller 14 of the electric vehicle 10 and the controller 24 of the charger 20.

One of the control lines 33 is a control line exclusively used to transmit a charge start signal and a stop signal from the charger 20 to the electric vehicle 20 and one of the control lines 34 is exclusively used to transmit a charge enable signal and an inhibit signal from the electric vehicle 10 to the charger 20.

Furthermore, the control lines 35 and 36 are communication lines used to perform the information receipt and transmission related to various types of charges in accordance with a communication format previously prescribed between the battery controller 14 of the electric vehicle and charger controller 24 of the charger 20.

Figure 2:
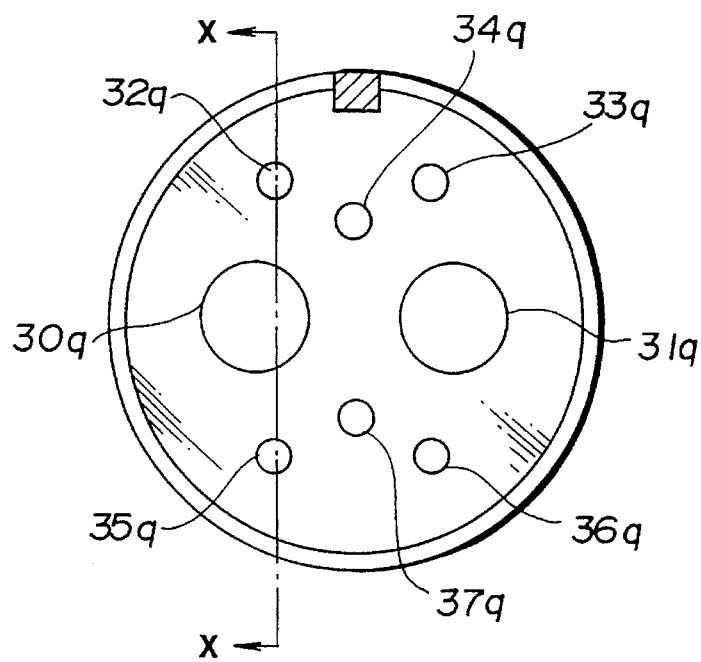
FIG. 2 is an elevation view of a connector located at a charger side.

FIG. 2 is an elevation view of the charger side connector 26.

Figure 3:
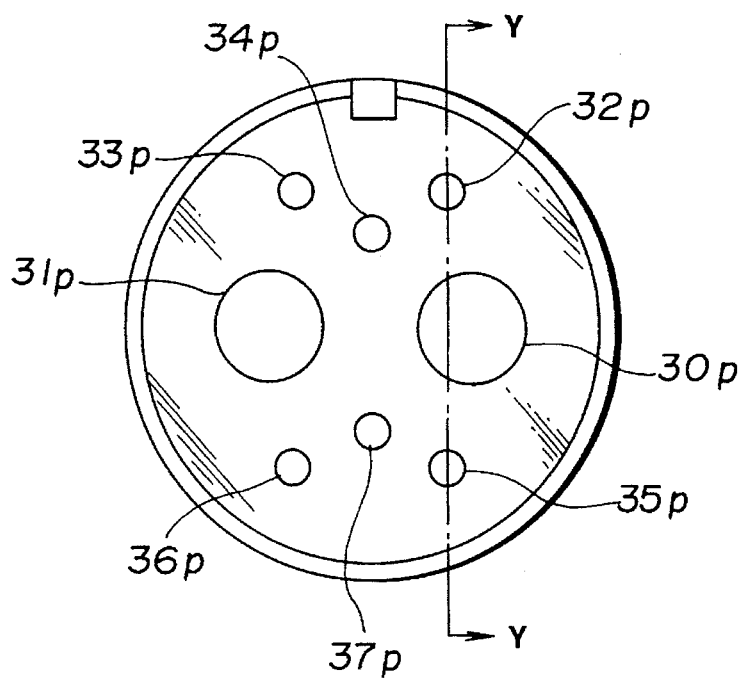
FIG. 3 is an elevation view of a connector located at an electric vehicle side.

FIG. 3 is an elevation view of the electric vehicle side connector 18.

Figure 4:
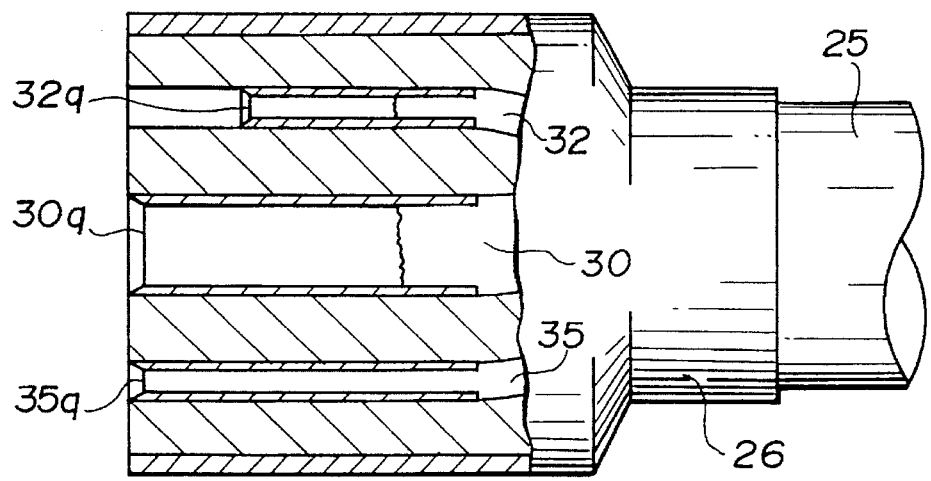
FIG. 4 is a cross sectional view cut away along a line X—X of the connector located at the charger side shown in FIG. 2.
Figure 5:
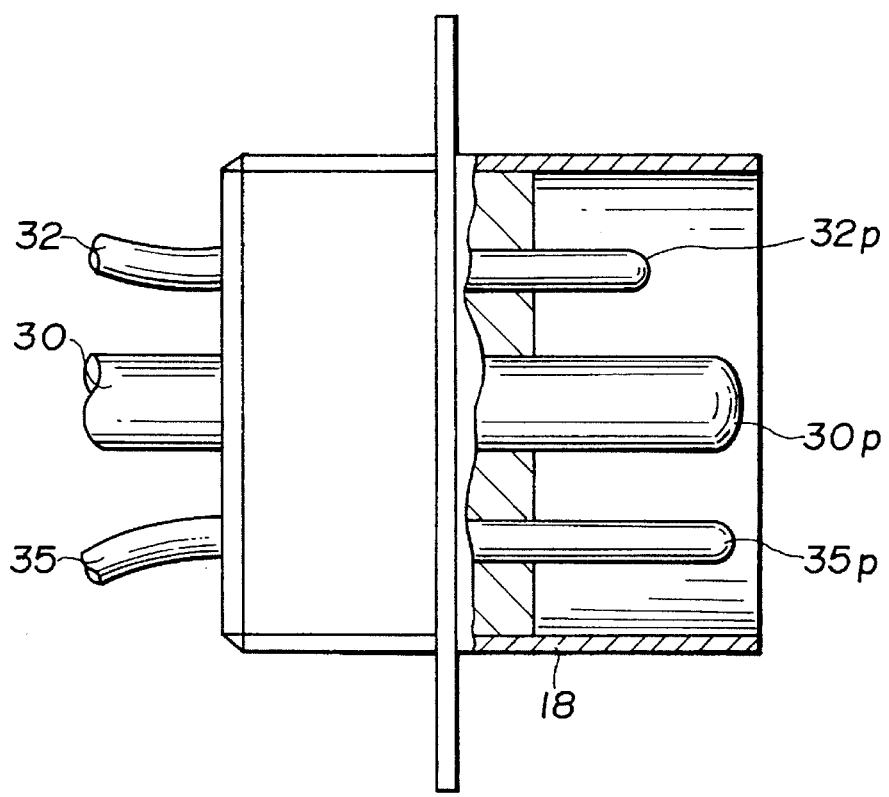
FIG. 5 is a cross sectional view cut away along a line Y—Y of the connector located at the electric vehicle side shown in FIG. 3.

In addition, FIG. 4 is a cross sectional view cut away along a line X—X of FIG. 3 showing the charger side connector 26 and FIG. 5 is a cross sectional view cut away along a line Y—Y of FIG. 3 showing the electric vehicle side connector 18.

Numerals $30q$ through $37q$ denote female pins of the charger side connector 26 to be connected to the power supply lines 30 and 31 and to the control lines 32 through 37, respectively.

In addition, numerals $30p$ through 37 denote male pins of the electric vehicle side connectors 18 to be connected to the power supply lines 30 and 31 and control lines 32 through 37, respectively.

Numeral 37 denotes the grounded line which has been omitted in FIG. 1.

With both connectors 18 and 26 connected, the male pins $30p$ through $37p$ fit into the female pins $30q$ through $37q$, respectively so that the charge current flows through the power supply lines 30 and 31 and control current flows through the control lines 32 through 37.

It is noted that although not shown in FIGS. 2 through 5, structures of the male pins and female pins of the power supply lines 31 are the same as those pin structures of the power supply line 30.

The male pin and female pin structures of the control lines 33, 34, 36, and 37 are the same as those of the pins of the control line 35.

The male pin $32p$ and female pin $32q$ of the control line 32 to detect the connection states of the connectors 18 and 26 have shorter lengths in their projections toward the tip of the connector as compared with other female pins $30q$, $31q$, $33q$, $34q$, $35q$, $36q$ and $37q$, ———, and male pins $30p$, $31p$, $33p$, $34p$, $35p$, $36p$ and $37p$, ———. Thereby, the connection between the connectors 26 and 18 become loose. When the charger side connector 26 is about to be disconnected from the electric vehicle side connector 18, the male pin $32p$ of the control line 32 is at first fitted out of the female pin $32q$ thereof so that the control current flowing through the control line 32 is interrupted.

However, at this time, the male pins and female pins of the other power supply lines 30 and 31 and control lines 33 through 37 are still in the fitted states so that the charge current and various control currents continue to flow through the power supply lines 30 and 31 and control lines 33 through 37.

If the loose fittings of both connectors 18 and 26 become larger, the power supply lines 30 and 31 and control lines 33 through 37 are fitted out thereof so that large sparks occur due to the abrupt interruptions of the charge current and control currents.

In the embodiment, the control current flowing through the control line 32 is detected. If the control current is interrupted, the controller determines that the loose in the connectors 18 and 26 occur and immediately interrupts the charge current flowing through the power supply lines 30 and 31.

In this way, before the connectors 18 and 26 are disconnected from each other, the charge current can be interrupted and the large sparks do not occur during the instantaneous disconnected state in the connectors 18 and 26.

The interlock relay 16c of the electric vehicle receives the power supply from the auxiliary battery 15 and is connected to the ground at the charger side via the connectors 18 and 26 and control line 32.

Hence, with the charger side connector 26 completely connected to the connector at the electric vehicle side connector 18, an energizing (exciting) current flows from the auxiliary battery 15 to the coil 16c. The interlock relay 16 is turned on so that its normally open contact 16a is closed and its normally off contact 16b is open. Consequently, the control signal indicating that the charger side connector 26 is completely connected to the electric vehicle side connector 18 is input to the battery controller 14 and the energization circuit of the switch coil 12c is open. In details, during the charge operation, the switch 12 connected between the battery 11 and running motor 13 is open and a power supply from the battery 11 to the running motor 13 is interrupted.

Figure 6:
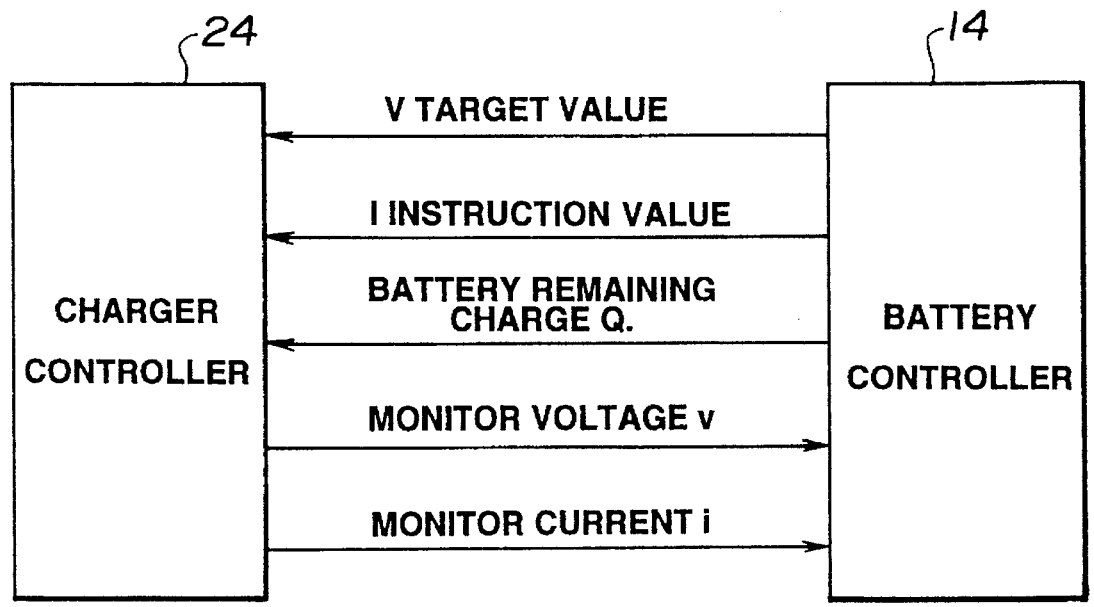
FIG. 6 is an explanatory view for explaining information receipt and transmission on a constant current charge mode between a battery controller of the electric vehicle and a charger controller of the battery charger.

FIG. 6 shows information receipt and transmission on a constant current charge mode between the battery controller 14 of the electric vehicle 10 and charger controller 24 of the charger 20.

Figure 7:
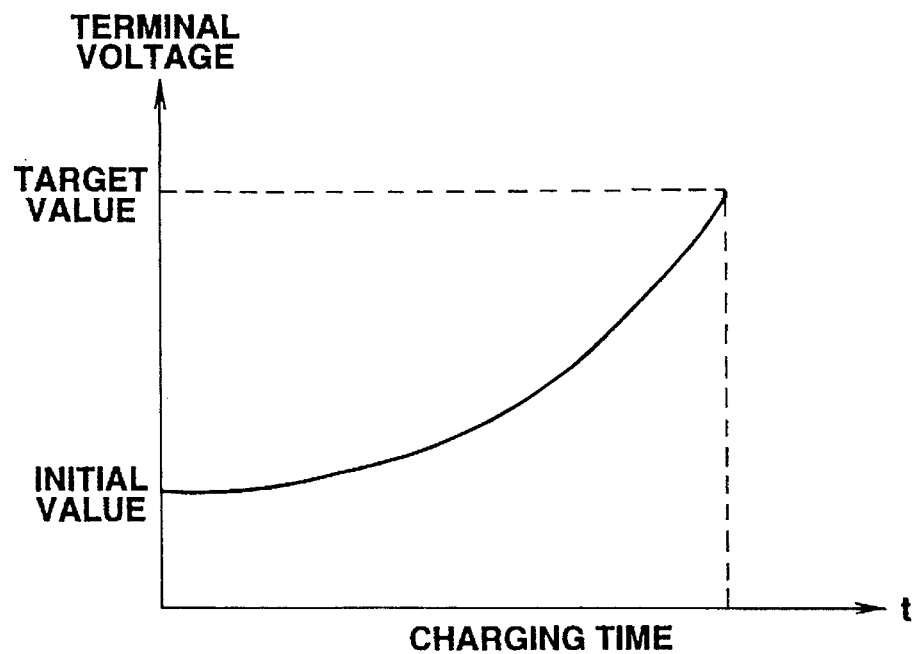
FIG. 7 is a characteristic graph representing a variation in time of a terminal voltage in the constant current charge mode.

In the constant current charge mode, as shown in FIG. 7, a terminal voltage of the battery is raised along with a passed time duration of the charging time.

As described above, when the terminal voltage exceeds a predetermined threshold value, the battery becomes higher temperature. Various inconveniences, then, occur. Therefore, it is necessary to stop charging when a target value of the terminal voltage during the charging operation is set according to the type of the battery and the terminal voltage reaches this target value.

A current instruction value I and the voltage target value V in the constant current charge mode are previously stored in an EEPROM (Electrically Erasable Programmable Read Only Memory) (not shown) of the battery controller 14 according to the type of the battery 11 to be installed in the electric vehicle 10.

When the constant current charge mode is selected, prior to the charging the current instruction value I and voltage target value V are read from the EEPROM and are transmitted to the charger controller 24 via control lines 35 and 36 together with a battery remaining quantity.

On the other hand, the charger controller 24 transmits the charged voltage v and current i detected by means of a sensor 23 via the control lines 35 and 36.

Figure 8:
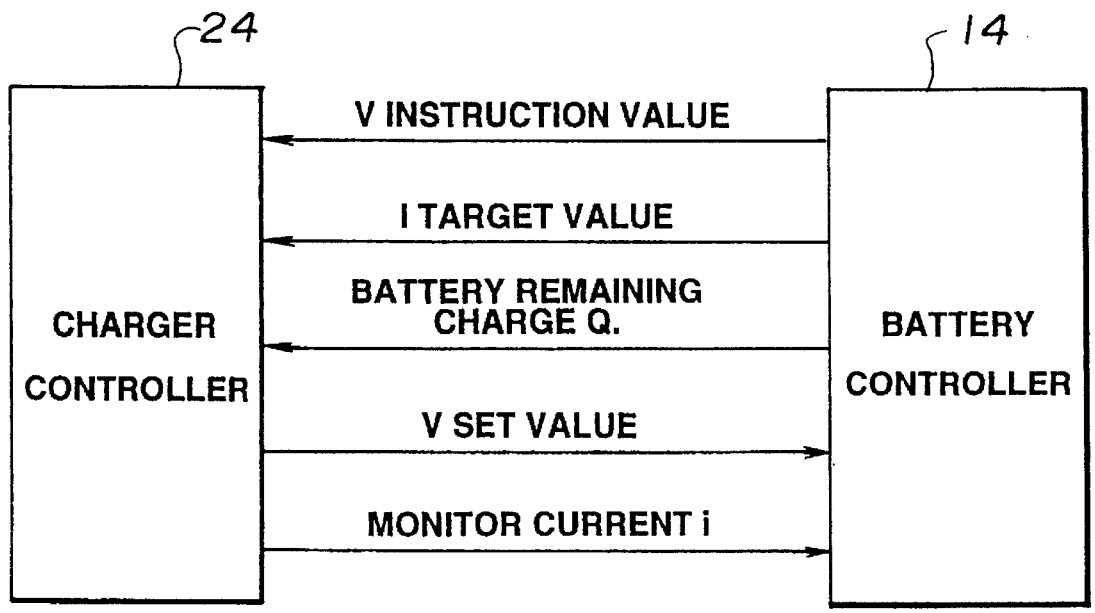
FIG. 8 is an explanatory view for explaining information receipt and transmission on a constant voltage charge mode between the battery controller of the electric vehicle and the charger controller of the battery charger.

FIG. 8 shows an information receipt and transmission on a constant voltage charge mode between the battery controller 14 of the electric vehicle and the charger controller 24 of the charger 20.

Figure 9:
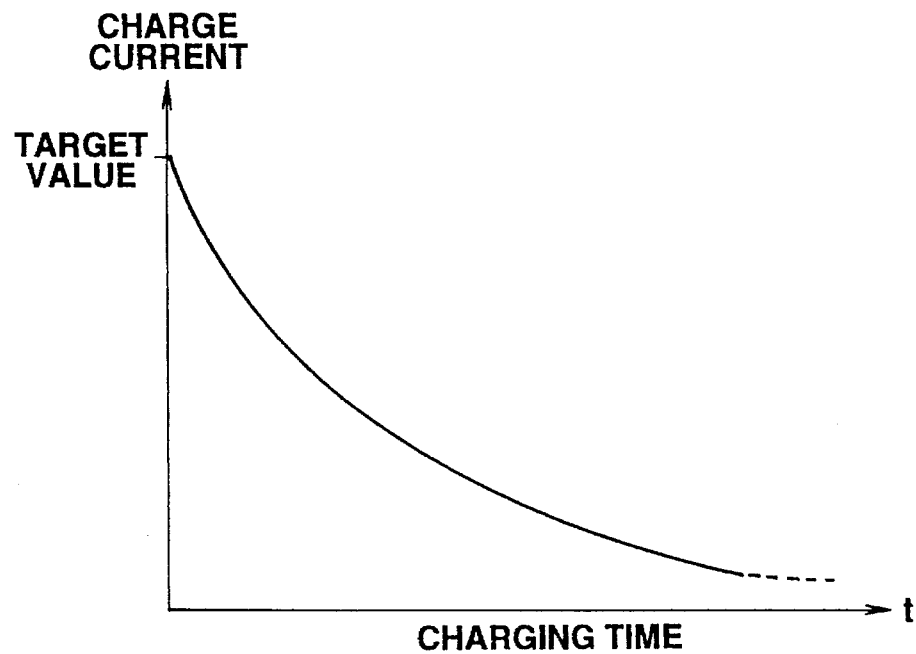
FIG. 9 is a characteristic graph of a variation in time of a charging current in a constant voltage charge mode.

In the constant voltage charge mode, as shown in FIG. 9, a large charge current flows immediately after the charge is started and a charge current is decreased along with the passed time duration of the charge time. Thus, it is necessary to set a current target value according to the kind of the battery and to control such that the charge current becomes below the target value.

A voltage instruction value V and current target value I in the constant voltage charge mode are previously stored in the EEPROM of the battery controller 14 according to the type of the battery 11 to be installed in the electric vehicle 10.

When the constant voltage charge mode is selected, prior to the charging the voltage instruction value V and current target value I are read from the EEPROM and are transmitted to the charger controller 24 via the control lines together with the information of the remaining quantity of the battery. On the other hand, the charger controller 24 transmits the voltage set value set according to the voltage instruction value V from the electric vehicle 10 and the current i detected by means of the sensor 23 via the control lines 35 and 36.

It is noted that the instruction values and target values of the voltages and currents determined according to the type of the battery to be used may be set through a DIP switch and/or jumper switch and these date may be stored in any ROM installed on the battery 11 itself, i.e., a main body of the battery 11.

Figure 10:
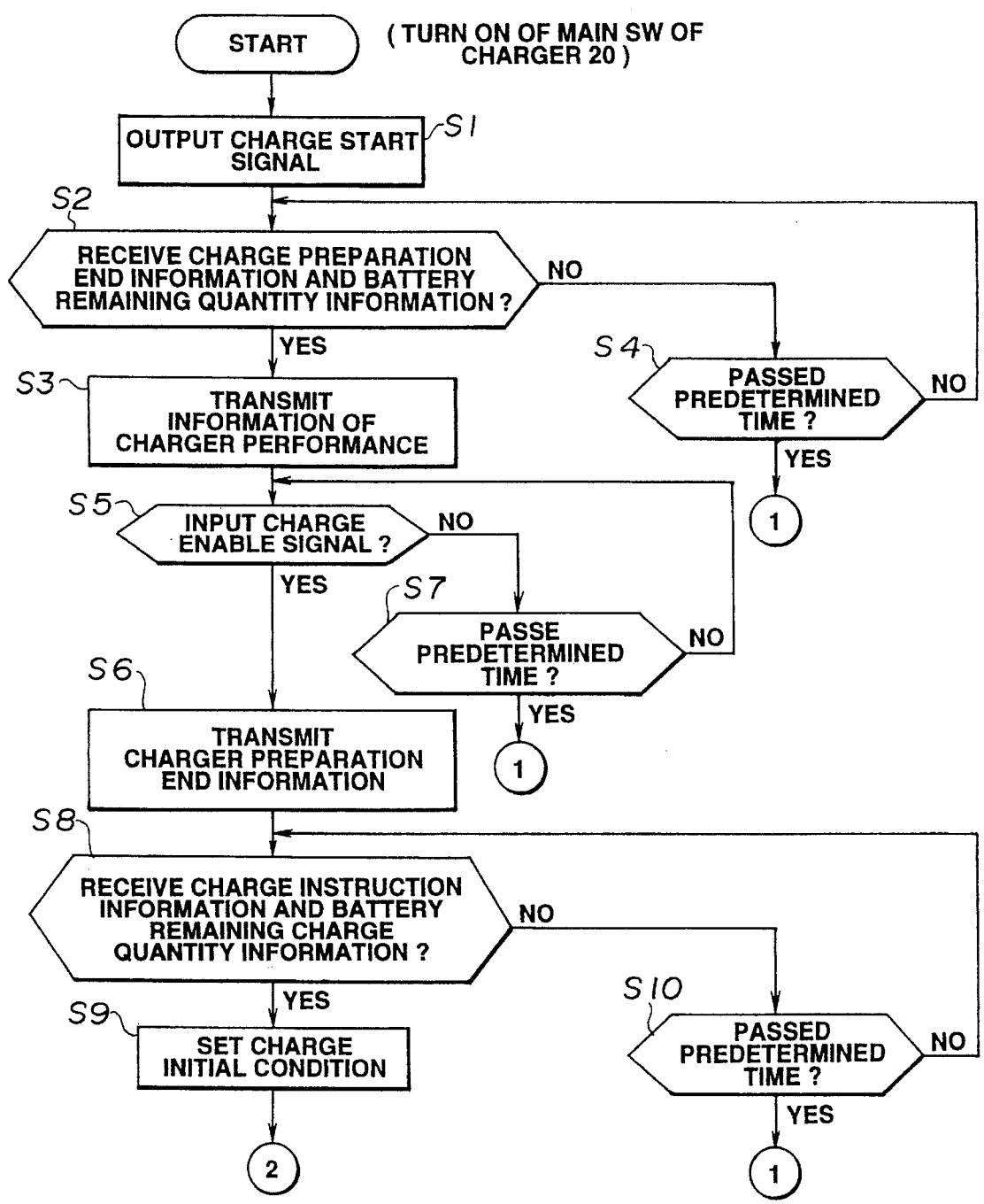
FIG. 10 A is an operational flowchart of a charger control program.
Figure 10:
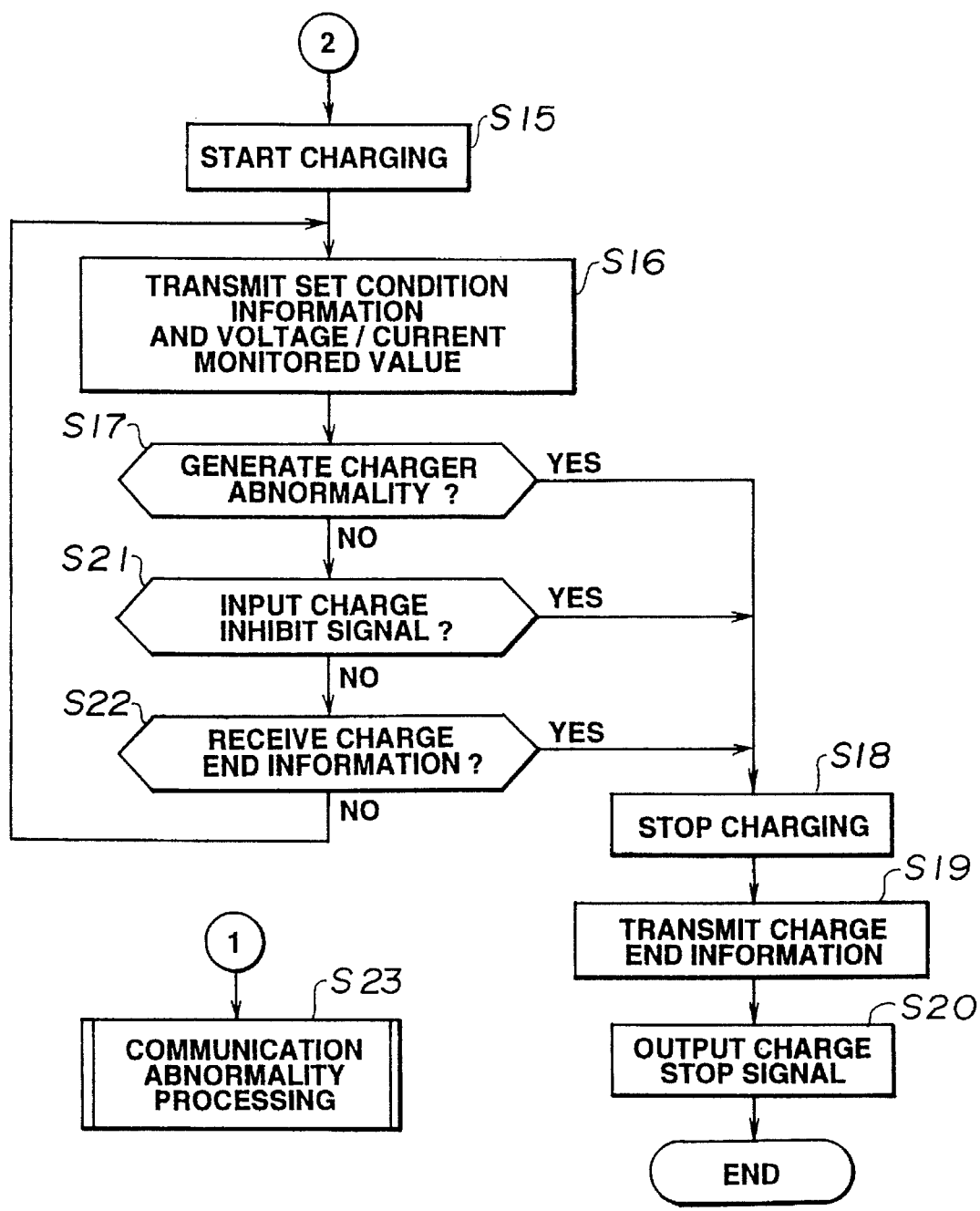
Figure 10:
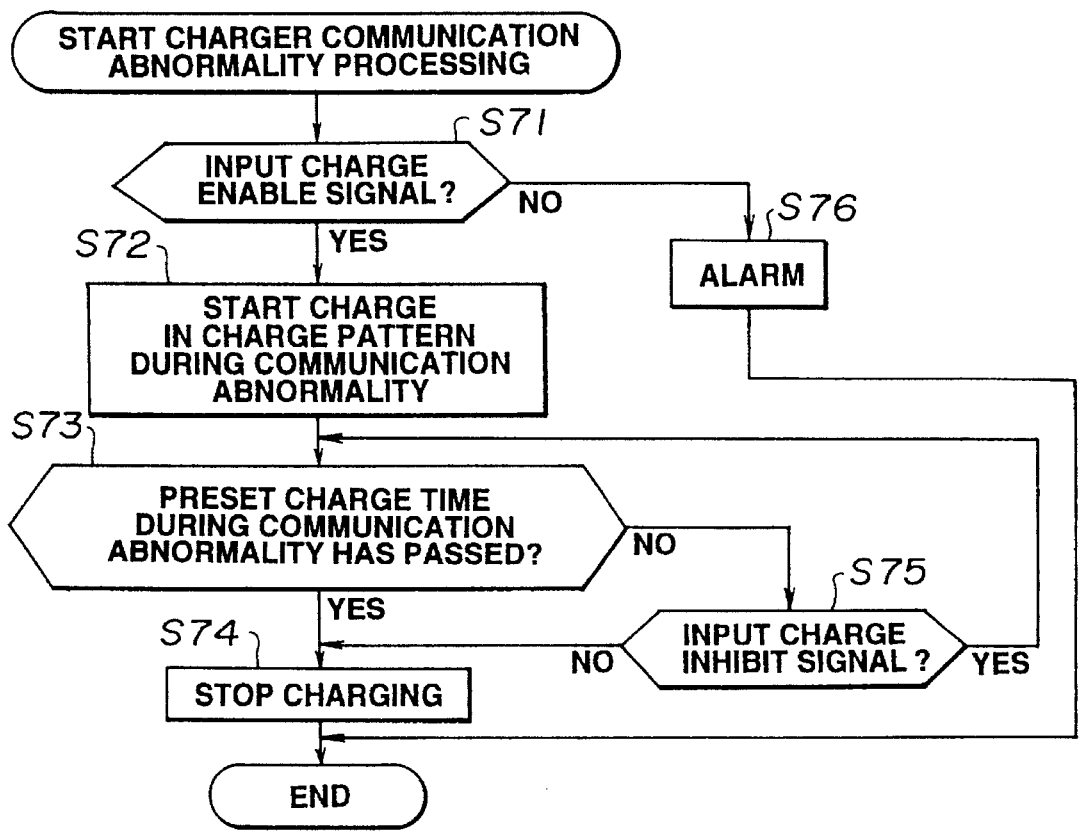

FIGS. 10 A and 10 B show integrally a flowchart on which the charger controller 24 is executed.

An operation of the charger 20 will be described below with reference to FIGS. 10 A and 10 B.

The microcomputer of the charger controller 24 starts the control program shown in FIGS. 10 A and 10 B in response to a turn on of a main switch (not shown) of the charger 20.

At a step S1, the charger controller 24 outputs a charge start signal to the battery controller 14 of the electric vehicle via the control line 32.

At a step S2, the charger controller 24 determines whether a charge preparation end information and a remaining quantity information have been received.

If the above-described information data are received, the routine goes to a step S3. If not received, the routine goes to a step S4.

At the step S4, the charge controller 24 determines whether a predetermined period of time has passed. If the above-described information data (charge preparation end information of the electric vehicle 10 and remaining quantity information of the battery 11) cannot be received until the passage of the predetermined period of time, the routine goes to a step S28 of FIG. 10 B.

At this time, a communication abnormality processing routine is executed as shown in FIG. 10 C which will be described later.

When the above-described information data can be received at the step S2, the routine goes to the step S3 in which the charger controller 24 transmits an information on a performance of the charger 20, namely, an allowable output voltage of the charger 20 and an allowable output current to the electric vehicle 10 via the control lines 35 and 36.

At the subsequent step S5, the charger controller 24 determines whether a charge enable signal has been transmitted from the electric vehicle 10 via the control line 34. If the charge enable signal is received, the routine goes to a step S6. If not received at the step S5, the routine goes to a step S7. At the step S7, if the charge enable signal is not received until another predetermined period of time has passed, the routine goes to the step S23 of FIG. 10 C. Then, the routine goes to the communication abnormality processing routine shown in FIG. 10 C.

If the charge enable signal is received at the step S5, the routine goes to the step S6 in which the preparation end information on the charger 20 is transmitted to the electric vehicle 10 via the control lines 35 and 36.

At the subsequent step S8, the charger controller 24 determined whether a charge instruction information and battery remaining quantity information have been received via the control lines 35 and 36 via the control lines 35 and 36.

The charge instruction information includes a charge mode instruction of either the constant voltage charge mode or the constant current charge mode; the voltage instruction value V and current target value I in the case of the constant voltage charge mode, and the current instruction value I and voltage target value V in the case of the constant current charge mode.

If the charger controller 24 receives the charge instruction information and battery remaining quantity information at the step S8, the routine goes to a step S9. If not received at the step S8, the routine goes to a step S10. At the step S10, the charger controller 24 waits the information data for another predetermined period of time. If not received until the passage of the other predetermined period of time, the routine goes to the step S23. Then, the routine enters the communication abnormality processing routine shown in FIG. 10 C.

If the charge instruction information and battery remaining quantity information are received at the step S8, the routine goes to the step S9 in which a charge initialization condition is set.

In details, the charger voltage and the charge current are set to a high voltage power supply 21 on the basis of the charge mode instruction transmitted from the electric vehicle 10, the instruction value of the voltage or current, the target value of the voltage or current, and the remaining quantity of the battery 11.

Next, the routine goes from the step S9 to a step S15 of FIG. 10 B in which a switch coil 22c is energized to turn on the switch 22 and the charging operation is started by controlling the high voltage power supply 21.

At the subsequent step S16, the charger controller 24 transmits the set value of either the voltage or current depending upon the charge mode and charge voltage or current detected by the sensor 23 via the control lines 35 and 36 to the electric vehicle.

At a step S17, the charger controller 24 determines whether an abnormality such as a leakage in voltage or current of the charger 20, a breakdown, overheat, or power failure in the high voltage power supply 21.

If the abnormality occurs at the step S17, the routine goes to a step S18. It no abnormality occurs, the routine goes to a step S21.

In a case where some abnormality occurs in the charger 20, the routine goes to a step S18 in which an operation of the high voltage power supply 21 is halted and the switch coil 22c is deenergized to open the switch 22 so that the charging operation is halted. Then, the routine goes to a step S19 in which the charger controller 24 transmits a charge end information to the electric vehicle 10 via the control lines 35 and 36 and thereafter the routine goes to a step S20 in which a charge stop signal is transmitted to the electric vehicle 10 via the control line 33.

If the charger 20 operates normally, the routine goes to a step S21 in which the charger controller 24 determines whether a charge inhibit signal is received from the electric vehicle 10 via the control line 34.

If the charge inhibit signal is received at the step S21, the routine goes to a step S18. If not received, the routine goes to a step S22.

In the case where the charge inhibit signal is received from the electric vehicle 10, some abnormality occurs in the electric vehicle 10 so that a charge halt processing is executed after the steps from the step S18.

If no abnormality occurs, the routine goes to the step S22 in which the charger controller 24 determines whether the charge end information is received from the electric vehicle 10 via the control lines 35 and 36.

If the charge end information has been received, the charger controller 24 determines that the charging operation is ended and the routine goes to the step S18 in which the charge halt processing is executed, If not received (no receipt of the charge end information), the routine returns to the step S16 in which the above-described routine is repeated.

FIG. 10 C shows the flowchart representing the charger abnormality processing routine.

With reference to FIG. 10 C, a countermeasure operation of the charger 20 when the communication abnormality occurs.

If the abnormality occurs, at a step S71, the charger controller 24 determines whether the charge enable signal is received from the electric vehicle 10 via the control line 34.

It is noted that when the electric vehicle fails in the charge enable state as described below, the charge enable signal is output via the control line 34.

That is to say, the charge enable state is defined as a main switch placed at an OFF position, a parking brake being braked, and a select lever being set to a P (Parking) or N (Neutral) position. Unless the electric vehicle 10 falls in at least the charge enable state, the charging is not carried out. The routine goes to a step S76 in which a warning information is issued and all of the processings are finished.

If the charge enable signal is received at the step S71, the routine goes to a step S72 in which a charge pattern during the occurrence in the communication abnormality is set to the high voltage power supply 21 and the charging operation is initiated with the switch 22 turned on. It is noted that the charge pattern at the step S72 is such that the charge is carried out in the constant current charge mode during the communication abnormality and the current instruction value is set lower than that in the constant current charge mode in the normal state.

At the subsequent step S73, the controller 24 determines whether a preset charge time during the occurrence of the communication abnormality has passed.

Figure 11:
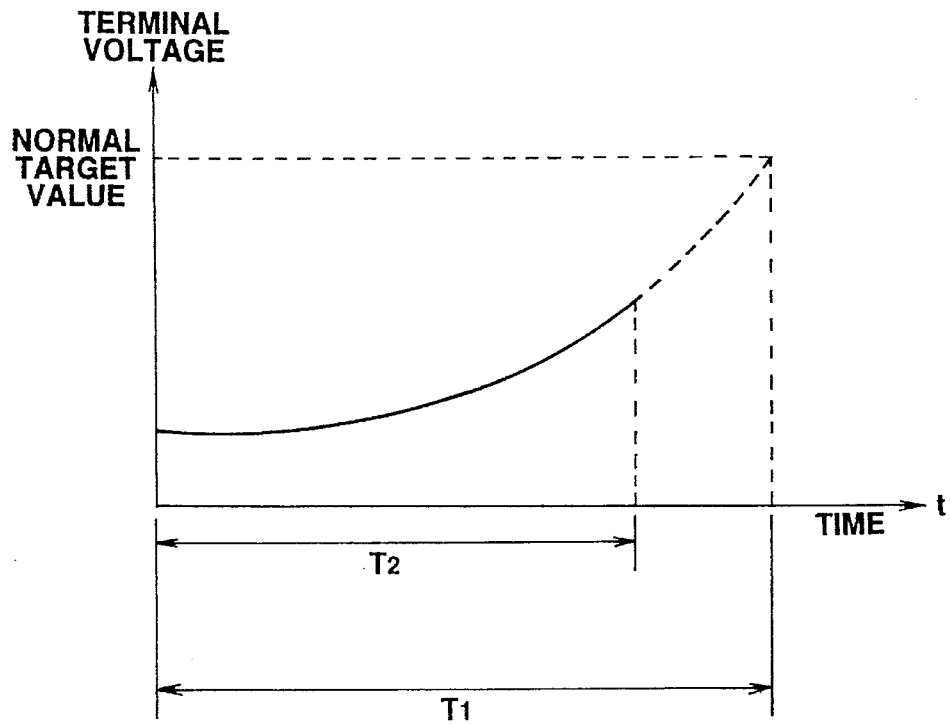
FIG. 11 is a characteristic graph of a charge time duration during the communication abnormality.

When the communication abnormality occurs, a constant current charge is carried out with a current lower than the normal communication state and, as shown in FIG. 11, the charge time $T_2$ during the occurrence of the communication abnormality is set which is shorter than that $T_1$ which is set during the normal communication state.

If the charge time $T_2$ is ended, the charge is forcefully ended upon the lapse of the time $T_2$. Upon the lapse of the time $T_2$, the routine goes to a step S74 in which the high voltage power supply 21 is halted and the switch 22 is open to halt the charging operation.

Before the lapse of the preset charge time $T_2$, the routine goes to a step S75 in which the charger controller 24 determines whether the charge inhibit signal is received from the electric vehicle 10 via the control line 34. If the charge inhibit signal is received, the routine goes to a step S74 in which the charging operation is halted. Otherwise, the routine returns to the step S73 to continue the charging operation. It is noted that the charge pattern during the occurrence of the communication abnormality and its charge time $T_2$ are stored in the EEPROM of the charger controller 24.

Since the control line 34 which serves to transmit the charge enable/charge inhibit signals from the electric vehicle is extended exclusively as separate line from the communication control lines 35 and 26, no influence of the failure in communication between the charger 20 and electric vehicle 10 is given to the control line 34.

In the electric vehicle 10, the controller 14 always monitors whether a predetermined charge quantity is reached on the basis of a terminal voltage across the battery 11 during the charging operation. Whenever the charge quantity reaches the predetermined quantity, the controller 14 outputs the charge inhibit signal even when it does not reach the charge time $T_2$ during the occurrence of the communication abnormality. Thus, an overcharge when the communication abnormality occurs can be prevented.

Figure 12:
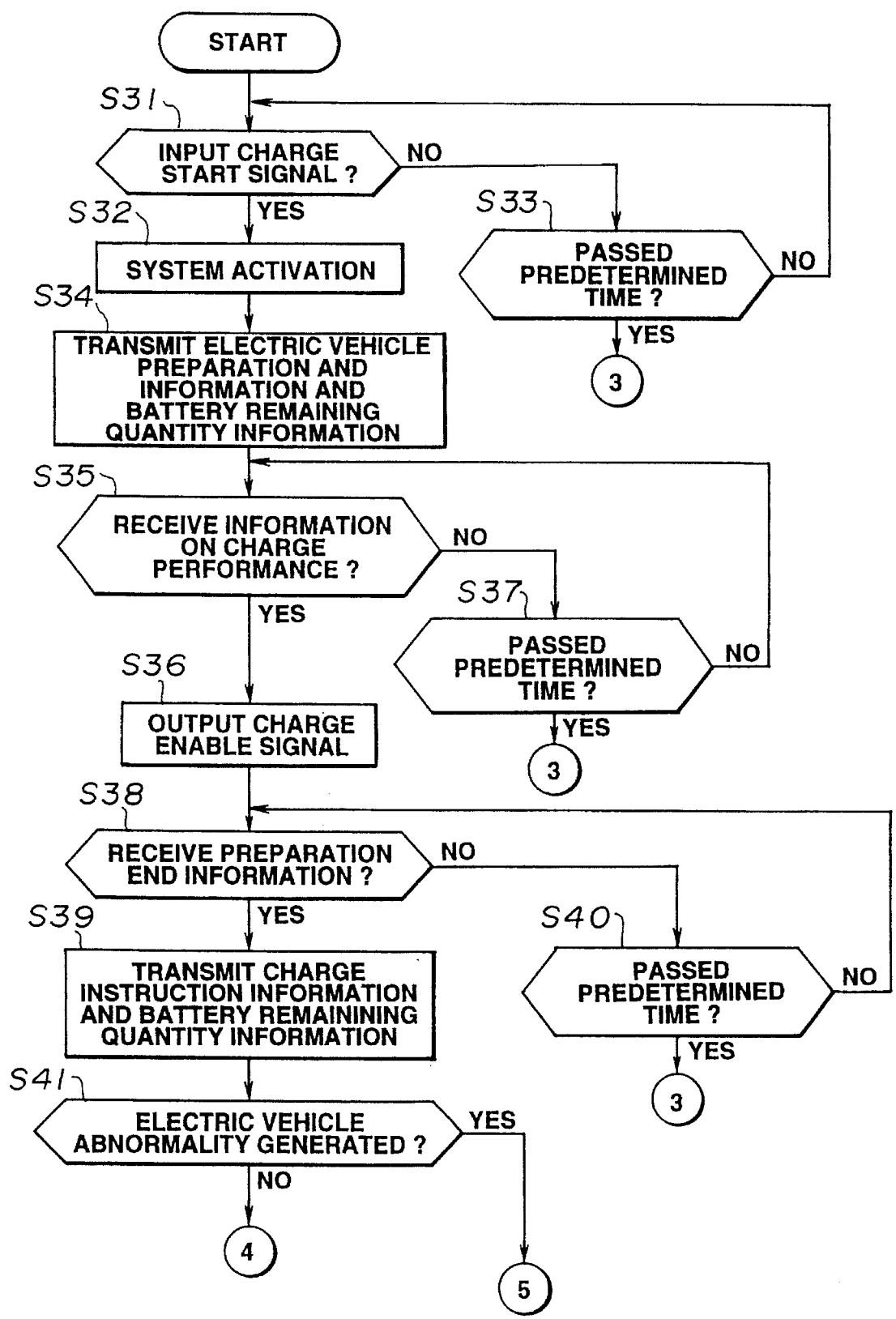
FIG. 12 is an operational flowchart representing an electric vehicle charge control program.
Figure 13:
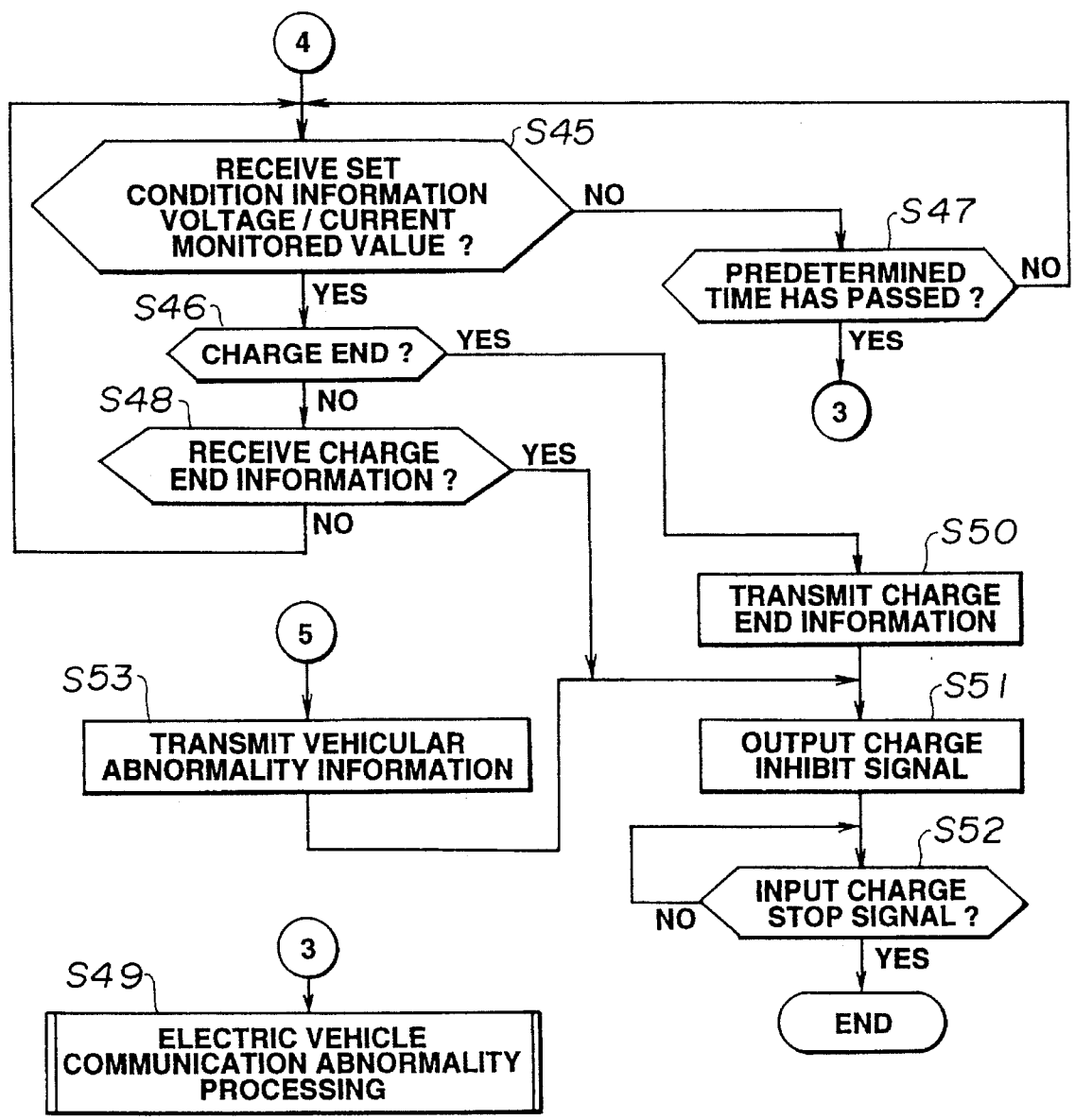
FIG. 13 is another succeeding operational flowchart from FIG. 12.

FIGS. 12 and 13 show integrally an operational flowchart to be executed in the battery controller 14. This series of the flowchart serves to explain the operation of the electric vehicle 10.

When the electric vehicle 10 is in the charge enable state with all vehicle maneuver systems being halted, the connector located at the charger side 26 is connected to the connector located at the electric vehicle 18, the interlock relay 16 is turned on so that the normally open contact 16a is closed, the microcomputer in the battery controller 14 starts the execution of the control program shown in FIGS. 12 and 13.

It is noted that a normally closed contact 16b of the interlock relay 16 is simultaneously open so that an energization circuit of the switch coil 12c is forcefully interrupted. Should the energization signal of the switch coil 12c is output from the running controller 17, the switch would not be turned on. With the charger connector 26 connected to the electric vehicle connector 18, the power supply from the battery 11 to the motor 13 is interrupted so that such an accident that the electric vehicle 10 erroneously starts during the charging operation can be prevented.

At the step S31, the battery controller 14 determines whether the charge start signal is issued from the charger 20 via the control line 33. If the charge start signal is received, the routine goes to a step S32. If not received, the routine goes to a step S33.

Figure 14:
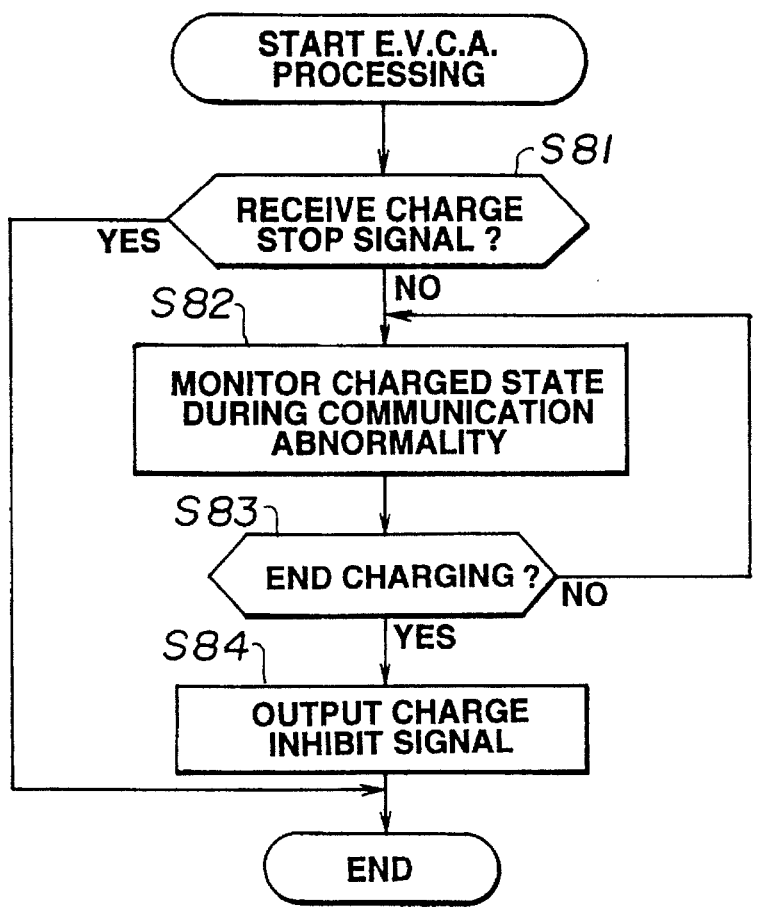
FIG. 14 is an operational flowchart representing the communication abnormality processing routine of the electric vehicle.

At the step S33, the charge start signal is not yet received until a predetermined period of time is passed. The routine goes to a step S49 in which another communication abnormality processing routine shown in FIG. 14 is executed.

In a case where the charge start signal is received from the charger 20, a charge system located in the electric vehicle 10 is activated at a step S32.

At the next step S34, the battery controller 14 transmits an electric vehicle preparation end information and battery remaining quantity information to the charger 20 via the control lines 35 and 36.

At a step S35, the battery controller 14 determines whether the charger performance from the charger via the control lines 35 and 86, namely, the allowable output voltage and allowable output current information of the charger 20 are received from the charger 20.

If these information data are received, the routine goes to a step S36. If these data are not received, the routine goes to a step S37.

At the step S37, if the information on the performance of the charger 20 is not yet received when a predetermined time has passed, the routine jumps to the step S49 in order to execute the other communication abnormality processing shown in FIG. 14.

If the information on the performance of the charger 20 is received, the routine goes to a step S38 in which the battery controller 14 outputs the charge enable signal and the routine goes to the next step S38 in which the battery controller 14 determines whether the charge preparation end information is received from the charger 20 via the control lines 35 and 36. If the charge preparation end information is received from the charger 20, the routine goes to a step S39 and, if not received, the routine goes to a step S40.

At the step S40, the controller 14 waits the information receipt of the charge preparation end for the predetermined period of time and if not received yet for the predetermined period of time, the routine goes to the step S49 of FIG. 13.

If the charge preparation end information is received from the charger 20, at the step S39, the battery controller 14 reads the voltage instruction value V and current target value I in the constant voltage charge mode and the current instruction value I and voltage target value V in the constant current charge mode which accords with the kind of battery 11 from the EEPROM. In addition, on the basis of the above-described information and already received performance information of the charger 20, the controller 14 determines the charge instruction value described above and transmits the determined charge instruction value information and battery remaining quantity of charges to the charger 20 via the control lines 35 and 36. At the next step S41, the battery controller 14 determines whether such an abnormality as the leakage of power in the electric vehicle 10, battery failure, and/or charge circuit breakage occurs. If the abnormality occurs, the routine goes to a step S53 of FIG. 13. If not occur, the routine goes to a step S45. If something is wrong in the electric vehicle 10, the battery controller 14 transmits the vehicle abnormality information to the charger 20 via the control lines 35 and 36. Then, the routine goes to a step S51 in which the controller 14 transmits the charge inhibit signal to the charger 20 and goes to a step S52 in which the controller 14 waits for receipt of the charge stop signal from the charger via the control line 33. If the charge stop signal is received, the execution of the program is ended.

If no trouble occurs in the electric vehicle 10, the routine goes to a step S45 in which the battery controller 14 determines whether the set values of the voltage and current from the charger 20 via the control lines 35 and 36 and the monitored values of the voltage and current have received from the charger 20.

If they are received at the step S45, the routine goes to a step S46 and if not yet received at the step S45, the routine goes to a step S47.

At the step S47, if the controller 14 does not receive them for the predetermined period of time, the routine goes to the step S49 in which the communication abnormality processing is executed.

If the above-described value information is received, the routine goes to a step S46 in which the controller 14 determines whether the charge operation is ended on the basis of the voltage and remaining quantity of the battery 11. If the charge operation is ended, the routine goes to a step S50. If not yet ended, the routine goes to a step S48.

When the charging operation is ended, the controller 14 transmits the charge end information to the charger 20 via the control lines 35 and 36. At the subsequent step S51, the charge inhibit signal is output via the charger 20 via the control line 34. At the step S52, the controller 14 waits until the charge stop signal is received from the charger 20 via the control line 33. When the charge stop signal is received, the execution of the program is ended. If the charge is not finished, at the step S48, the controller 14 determines whether the charge end signal is received from the charger 20 via the control lines 35 and 36. If the charge end signal is received, the routine goes to a step S51. If not received, the routine returns to the step S45 to repeat the above-described processing.

FIG. 14 shows the electric vehicle communication abnormality processing flowchart in the step S49.

With reference to FIG. 14, the operation of the electric vehicle when the communication abnormality occurs will be explained.

If the communication abnormality occurs, at a step S81, the battery controller 14 determines whether the charge stop signal is received from the charger 20 via the control line 33. The control line 33 through which the charge start/charge stop signals are transmitted is extended exclusively from the charger 20 and is separate from the lines 35 and 36, no influence of the failure in the communication system between the charger 20 and electric vehicle 10 is given thereto. In the charger 20, the charge operation is stopped if something is wrong in the device itself and the charger controller 24 transmits the charge stop signal to the electric vehicle 10 via the control line 33.

If the controller 14 receives the charge stop signal at the step S81, all processings are ended. If no charge stop signal is received, the routine goes to a step S82 in which the controller 14 monitors the charged state from the terminal voltage change across the battery 11.

At the subsequent step S83, the controller 14 determines whether the charge is finished on the basis of the terminal voltage across the battery 11. If the charge is finished, the routine goes to a step S84. If not yet finished, the routine returns to the step S82 to continue the monitoring of the charge. It is noted that the finish of the charge is determined when the terminal voltage of the battery 11 has reached the preset voltage level.

After the finish of the charge is determined, the controller 14 outputs the charge inhibit signal to the charger 20 via the control line 34 to stop the charge during the communication abnormality occurrence.

Figure 15:
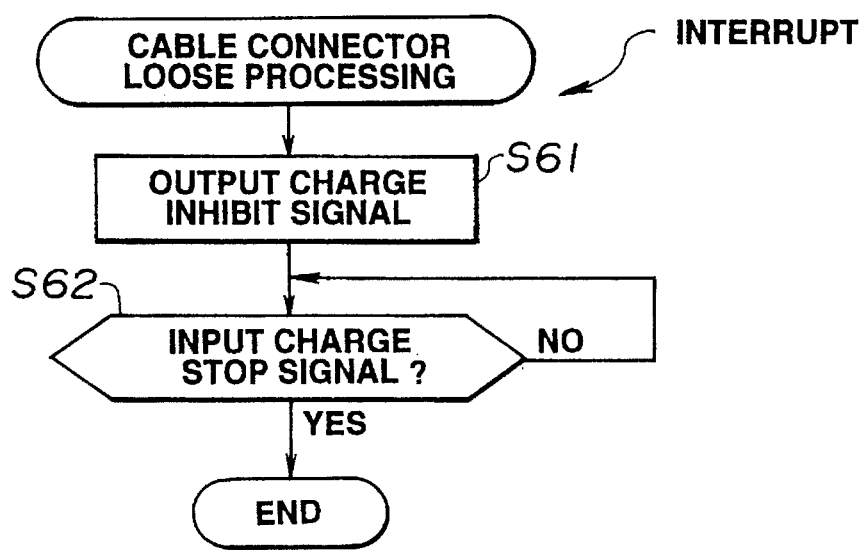
FIG. 15 is an operational flowchart representing a connector loose processing routine.

FIG. 15 shows a flowchart representing a connector loose processing routine.

As described above, the microcomputer of the battery controller 14 starts to execute the control program shown in FIGS. 12 and 13 upon closure of the interlock relay contact 16a with the charger connector 26 connected to the electric vehicle side connector 18.

However, during the execution of the program shown in FIGS. 12 and 13, the connection of both connectors 26 and 18 becomes loose due to some reason so that the interlock relay 16 is turned off and the normally open contact 16a is open, an interrupt of the microcomputer of the battery controller 14 occurs so that the microcomputer executes the routine shown in FIG. 15.

That is to say, at a step S61, the microcomputer of the controller 14 transmits the charge inhibit signal to the charger 20 via the control line 34. At the next step S62, the microcomputer of the controller 14 waits until the charge stop signal is received from the charger 20 via the control line 34. When the charge stop signal is received from the charger 20, all processings of FIG. 15 are ended.

In this way, when the communication abnormality is detected, the charge of the battery 11 is carried out in accordance with the charge pattern during the communication abnormality previously set in the charger 20. Thus, a minimum charge can be assured even if the communication abnormality occurs.

Since, in the embodiment, the charge is carried out with a lower current than that in the normal state during the occurrence of communication abnormality and the charge is forcefully stopped when the charge time $T_2$ set during the occurrence of the communication abnormality is reached, the minimum charge can be carried out in safety even if the communication system has failed between the charger 20 and electric vehicle 10.

Furthermore, since the exclusive control line 34 is installed through which the charge inhibit signal is transmitted from the electric vehicle 10 to the charger 20 and which is separate from the communication control lines 35 and 36 and is used to transmit the charge inhibit signal to the charger 20 from the electric vehicle 10 when the charged quantity of the battery is monitored and reaches the preset quantity during the occurrence of the communication abnormality, and the charge operation is halted even before the charged time $T_2$ is passed during the occurrence of the communication abnormality, the safe charge operation can be achieved.

It is noted that the present invention is applicable to all vehicles in which the motors which are driven according to charged powers of the batteries.

In addition, the charge pattern during the occurrence of the communication abnormality is not limited to the embodiment and the constant voltage charge with the charge voltage which is lower than the charge voltage in the normal state may be carried out.

As described hereinabove, since, according to the present invention, the charging across the battery is carried out in accordance with the charge pattern preset in the case of the occurrence of the communication abnormality, the minimum charge becomes possible even when the communication abnormality in either of the charger or electric vehicle occurs.

It will fully be appreciated by those skilled in the art that the foregoing description has been made to the preferred embodiment and various changes and modifications may be made without departing from the scope of the present invention which is to be defined by the appended claims.

What is claimed is:

1. A charging apparatus for charging a battery installed in a battery driven electric vehicle, comprising:
   a) a charger having a power supply;
   b) communication means, installed in both of the charger and electric vehicle, for transmitting and receiving information on a charging operation from and to the charger and electric vehicle;
   c) abnormality detecting means for detecting whether an abnormality in the communication between the charger and electric vehicle occurs; and
   d) controlling means for carrying out the charge to the battery of the electric vehicle in accordance with a special charge protocol previously set when the abnormality detecting means detects the abnormality in the communication therebetween.

2. A charging apparatus for charging a battery installed in a battery driven electric vehicle as claimed in claim 1, wherein said abnormality detecting means and said controlling means are installed in the charger.

3. A charging apparatus for charging a battery installed in a battery driven electric vehicle as claimed in claim 2, wherein said communication means comprise a charger controller installed in said charger, a cable connected to said charger controller, and a battery controller connected to said cable.

4. A charging apparatus for charging a battery installed in a battery driven electric vehicle as claimed in claim 3, wherein said cable includes two power supply lines and a plurality of control lines, the two power supply lines being used to supply a charge power to the battery of the electric vehicle from the charger, a first control line of the control lines being used to detect whether a pair of connectors located at the charger side and located at the electric vehicle side are connected together normally, said first control line being grounded at the charger side and being connected to a coil of an interlock relay installed in the electric vehicle, a second control line of the remaining control lines being used exclusively for transmitting a charge start signal and a charge stop signal from the electric vehicle to the charger, a third control line of the remaining control lines being used exclusively for transmitting a charge enable signal and charge inhibit signal from the electric vehicle to the charger, and two third control lines of the remaining control lines being used for transmitting and receiving information data between the charger and electric vehicle in a predetermined format of communication.

5. A charging apparatus for charging a battery installed in a battery driven electric vehicle as claimed in claim 4, wherein a male pin and a female pin of said first control line are projected toward tips of the respective connectors and are shorter than those pins of the other control lines so that when the pair of the connectors become loose and a tight fitting of both male and female pins is disconnected at first, a control signal current flowing through the first control line is interrupted and wherein when the control signal current flowing through the first control line is interrupted, the charge current flowing through the power supply lines are immediately interrupted.

6. A charging apparatus for charging a battery installed in a battery driven electric vehicle as claimed in claim 5, wherein the electric vehicle is provided with an auxiliary battery which is separate from the battery connected to at least one motor by which the electric vehicle runs, the coil of the interlock relay receives an energization current from the auxiliary battery and is grounded at the charger side via the first control line, and when the pair of the connectors are connected completely without loose state of the control lines, the coil of the interlock relay is energized to turn on the interlock relay, a normally open contact thereof being open and a normally closed contact being open so that the control signal indicating that both connectors are connected completely is transmitted from the charger controller to the battery controller via the first control line and an energization circuit of a switch coil is open, thus the switch connected between the battery and motor being open and the power supply from the battery to the motor being interrupted during the charge operation.

7. A charging apparatus for charging a battery installed in a battery driven electric vehicle as claimed in claim 6, wherein the charge controller comprises a microcomputer, said microcomputer executing a control program in response to a turn on of a main switch of the charger; said control program including the steps of: a) transmitting a charge start signal to the battery controller of the electric vehicle via the first control line; b) determining whether a charge preparation end information and a remaining quantity of charges of the battery have been received from the electric vehicle; c) transmitting a performance information of the charger to the electric vehicle via the fourth control lines when determining that the charge preparation end information and remaining quantity information have been received; d) determining whether the charge enable signal has been received from the electric vehicle via the third control line; e) transmitting a charger charge preparation end information to the electric vehicle via the fourth control lines when determining that the charge enable signal has been received; f) determining whether a charge instruction information and the battery charge remaining information have been received from the electric vehicle via the fourth control lines; g) setting a charge initialized condition when determining that the charge instruction information and the battery charge remaining quantity information have been received; h) energizing a coil of a switch installed in the charger and controlling a high voltage power supply installed in the charger so as to start the charging operation; and i) transmitting a set value of a charge voltage or charge current according to a charge mode and a charge voltage and charge current sensed by means of a sensor which is so constructed as to detect the charge voltage and charge current in the two power supply lines to the electric vehicle via the fourth control lines.

8. A charging apparatus for charging a battery installed in a battery driven electric vehicle as claimed in claim 7, wherein said control program further includes the steps of: j) determining whether the charger has operated normally; k) determining whether the charge inhibit signal has been received via the third control line when the charger has operated normally; l) determining whether a charge end information has been received from the electric vehicle via the fourth control lines when determining that the charge inhibit signal has not received from the electric vehicle via the third control line; and m) processing a charge stop routine such that the switch coil is open to open the switch installed in the charger so as to stop the charging operation with the high voltage power supply turned off when determining that the charger end information has been received.

9. A charging apparatus for charging a battery installed in a battery driven electric vehicle as claimed in claim 8, wherein said abnormality detecting means comprises the control program executed by the charger controller, said control program includes the steps of j) in which the charger controller determines whether a leakage in power in the charger, and/or an overheat and power failure in the high voltage power supply occur and when determining that any one of the leakage, overheat, and power failure in the high voltage power supply occurs in the step j), the routine goes to the step m).

10. A charging apparatus for charging a battery installed in a battery driven electric vehicle as claimed in claim 9, wherein said abnormality detecting means comprises the control program executed by the charger controller, said control program includes the steps of: n) waiting the receipt of the charger preparation end information and the battery charge remaining quantity information for a predetermined period of time after the step b); o) waiting the receipt of the charge enable signal for the predetermined period of time after the step d); and p) waiting the receipt of the charge instruction information and battery charge remaining quantity information for the predetermined period of time after the step f).

11. A charging apparatus for charging a battery installed in a battery driven electric vehicle as claimed in claim 10, wherein said controlling means comprises the charger controller having the microcomputer, said microcomputer executing a communication abnormality processing routine after each of the steps n), o) and p), the communication abnormality processing routine includes the steps of q) determining whether the charge enable signal has been received from the electric vehicle via the third control line, said charge enable signal being output when a main switch of the electric vehicle is turned off, a parking brake thereof is braked, and a select lever thereof is in a P position or in an N position, r) setting a charge pattern at the high voltage power supply in the communication abnormality occurrence and turning on the switch so as to start the charging operation in the charge pattern when the charge enable signal has been received at the step q); s) determining whether a preset charge time is passed; and t) stopping the high voltage power supply and opening the switch so as to stop the charging operation after the preset charge time is passed.

12. A charging apparatus for charging a battery installed in a battery driven electric vehicle as claimed in claim 11, wherein the charge pattern is such that the charging operation in a constant current charge mode is carried out, setting a current instruction value which is lower than the current instruction value in the normal state and wherein the preset charge time is shorter than a charge time in the normal state.

13. A charging apparatus for charging a battery installed in a battery driven electric vehicle as claimed in claim 12, wherein before the preset charge time has passed, the processing routine executes the steps of u) determining whether the charge inhibit signal has been received; and v) stopping the charge when the charge inhibit signal has been received, the charge inhibit signal being output from the electric vehicle when a terminal voltage of the battery reaches a preset charge quantity.

14. A charging apparatus for charging a battery installed in a battery driven electric vehicle as claimed in claim 13, wherein said electric vehicle further includes a running controller for controlling a running system of the electric vehicle including the motor and said battery controller has the microcomputer, said microcomputer executing the communication control program in response to the open of the interlock relay with the charge enabled state, the running controller to halt the running system, and both connectors interconnected.

15. A charging apparatus for charging a battery installed in a battery driven electric vehicle as claimed in claim 14, wherein when the execution of the communication control program is started, the power supply to the motor is interrupted with both connectors interconnected.

16. A charging apparatus for charging a battery installed in a battery driven electric vehicle as claimed in claim 15, wherein said communication control program includes the steps of:

1) determining whether the charge start signal is received from the charger via the second control line;
2) activating a charge system of the electric vehicle when receiving the charge start signal;
3) transmitting the charge preparation end information and battery charge remaining quantity information via the fourth control lines to the charger;
4) determining whether the performance information of the charger via the fourth control lines;
5) transmitting the charge enable signal to the charger via the third control line when receiving the performance information from the charger;
6) determining whether the charge preparation end information is received from the charger via the fourth control lines;
7) determining a voltage instruction value and current target value in a constant charge mode or a current instruction value and a voltage target value in a constant voltage charge mode depending on the kind of the battery and transmitting the charge instruction information and battery remaining quantity information via the fourth control lines to the charger when receiving the charge preparation end information;
8) determining whether a leakage in power in the electric vehicle, a battery failure, or charge system failure is present in the electric vehicle;
9) determining whether both of the set value of either the voltage or current and the monitored values of the voltage and current have been received from the charger via the fourth control lines when no abnormality is found in the electric vehicle;
10) determining whether the charge operation is ended on the basis of a voltage across the battery and the charge remaining quantity when receiving the set values and monitored values in the step 9);
11) transmitting the charge end information to the charger via the fourth control lines when the charge operation is ended;
12) transmitting the charge inhibit signal to the charger via the third control line; and
13) waiting until receipt of the charge stop signal from the charger and ending the communication control program when receiving the receipt of the charge stop signal.

17. A charging apparatus for charging a battery installed in a battery driven electric vehicle as claimed in claim 16, wherein the battery controller executes the communication abnormality processing routine when a predetermined time has passed after any one of the steps of 1), 4), 6), and 9) and wherein said communication abnormality processing routine includes the following steps of:

14) determining whether the charge stop signal is received from the charger via the second control line;
15) monitoring the charged state according to the terminal voltage of the battery when not receiving the charge stop signal;
16) determining whether the charge operation during the occurrence of the communication abnormality is ended on the basis of the terminal voltage of the battery; and
17) transmitting the charge inhibit signal to the charger via the third control line when determining that the charge operation during the occurrence of the communication abnormality is ended so as to halt the charge during the occurrence of the communication abnormality.

18. A charging apparatus for charging a battery installed in a battery driven electric vehicle as claimed in claim 17, wherein the battery controller executes an interrupt processing routine when both of the pair of the connectors become loose and when the normally open contact of the interlock relay is open during the execution of the control program, the interrupt processing routine including the steps of:

18) transmitting the charge inhibit signal to the charger via the third control line; and
19) waiting the receipt of the charge stop signal from the charger.

19. A charging apparatus for charging a battery installed in a battery driven electric vehicle as claimed in claim 18, wherein the charge time $T_2$ during the occurrence of the communication abnormality is set shorter than the charge time $T_1$ in the normal states of both charger and electric vehicle.

20. A charging apparatus for charging a battery installed in a battery driven electric vehicle as claimed in claim 19, wherein the special charge protocol in the occurrence of the communication abnormality is stored in an EEPROM of the charger controller.

21. A method for charging a battery installed in a battery driven electric vehicle, comprising the steps of:

a) transmitting and receiving information on a charging operation from and to a charger having a high voltage power supply and electric vehicle;

b) detecting whether an abnormality in the communication between the charger and electric vehicle occurs; and d) carrying out the charge to the battery of the electric vehicle in accordance with a special charge protocol previously set when detecting that the abnormality in the communication therebetween occurs.

\* \* \* \* \*